United States Patent

Verboom

(12) United States Patent
(10) Patent No.: US 6,236,627 B1
(45) Date of Patent: May 22, 2001

(54) TRACKING METHOD AND TRACK FORMAT BASED ON QUADRATURE WOBBLE

(75) Inventor: Johannes J. Verboom, Colorado Springs, CO (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/213,526

(22) Filed: Dec. 17, 1998

(51) Int. Cl.[7] .................................................. G11B 7/00
(52) U.S. Cl. ................................ 369/44.26; 369/44.41; 369/275.4
(58) Field of Search ........................ 369/44.26, 44.28, 369/44.41, 32, 54, 58, 59, 47, 275.1, 275.3, 275.4, 47.1, 47.15, 47.28, 53.1, 53.41

(56) References Cited

U.S. PATENT DOCUMENTS

| | | |
|---|---|---|
| 5,434,836 | 7/1995 | Kuribayashi et al. .......... 369/44.34 |
| 5,646,932 | 7/1997 | Kuribayashi et al. .......... 369/275.3 |
| 5,872,767 * | 2/1999 | Nagai et al. ................ 369/44.26 |

* cited by examiner

*Primary Examiner*—Muhammad Edun
(74) *Attorney, Agent, or Firm*—Michael E. Belk

(57) ABSTRACT

An optical recording medium having a number of adjacent tracks for storing digital optical information is provided, such as an optical disc. The tracks extend in a tangential direction, for example, surrounding the center of the disc. Each track is separated by a pitch amount in a radial direction, for example, outward from the center across the tracks. The tracks each have a servo field comprising one tracking mark located on the track in one of four discrete tangential positions A, B, C and D on the track. There is a mark in one of these four positions for every four adjacent tracks on the media. The position of the tracking marks repeat in the same sequence for every four adjacent tracks. For any four such adjacent tracks, the tracks having marks at positions A and B are separated by one track, and tracks having marks at positions C and D are separated by one track.

18 Claims, 5 Drawing Sheets

TRACKING METHOD AND TRACK FORMAT BASED ON QUADRATURE WOBBLE

BACKGROUND AND SUMMARY OF THE INVENTION

This invention generally pertains to the field of digital data recording. In particular, the invention focuses on a tracking method and track format for optical data recording.

An optical record carrier, also referred to as an optical disc, is typically preformatted with a spiral track, usually spiraling outward with a fixed track-pitch. One entire revolution of the spiral is typically referred to as the track. Tracks are typically divided into sectors. Sectors are where digital information is stored in the form of marks and pits, and from which information will be read or retrieved. A track of a spinning disc is read via the light reflected from the marks and pits, which is processed into an electrical signal.

(While pits and marks can refer to, respectively, the pre-formatted data and the information that is stored by the user on the disc, such distinctions in nomenclature is not always made. Thus, this Application will generally refer to "marks" as any information (pre-formatted information, information written by the user, etc.) on the disc.)

For a disc having multiple concentric tracks, the direction at a point along a track is referred to as the tangential direction, while the direction normally across the tracks (i.e., from the center of the disc outward) is referred to as the radial direction.

The pre-formatted data on the tracks of the disc include a servo field or region. Marks in the servo field are used to maintain the laser's radial alignment with respect to the particular track that is being read. The reading and processing of marks in the servo field provide an indicia of the laser's radial position with respect to a track and allow for it's correction. Thus, proper reading and processing of the other marks (such as the information stored by the user) on the track is better assured.

An example of a prior art track format is given in FIG. 1. The format is representative of the one used in the LM4000 media of Philips Laser and Magnetic Storage. FIG. 1 gives a simplified schematic of the format of certain marks in the servo field. It is noted that although the four tracks shown in FIG. 1 (labeled Tracks N to N+3) are concentric with the center of the optical disc they reside on, the part of the servo field shown in FIG. 1 is a small portion of the overall track and thus appears as a straight line in FIG. 1. (The same applies for ensuing figures.)

As shown in FIG. 1, the center of the disk is above Track N, and radial and tangential directions are designated with respect to the track segments shown. For the media shown in FIG. 1, the media would spin in a clockwise direction about the center; thus, the segment shown in FIG. 1 is envisioned moving from right to left on the page. The optical spot used to read the tracks would project onto the segment from a fixed tangential position, and would be movable in the radial direction.

As seen, the tracking marks are located at tangential positions A and B for each track. (The tracking marks will also be referred to as "wobble" marks.) The tracking marks are radially located between tracks and on alternate sides of a particular track. Tracking marks A are above each track as shown in FIG. 1, while tracking mark B is below it.

Also shown on the right hand side of FIG. 1 is a "Tracking Error Signal." This graph represents the difference of signal strengths of the tracking marks (A−B) versus radial position of the laser spot. Thus, for a radial position of the laser spot, the Tracking Error Signal strength represents the signal strength read at track position A minus the signal strength read at track position B.

Thus, the Tracking Error Signal is zero when the laser spot is located exactly over a track and increases in magnitude (in a positive or negative direction) as it moves radially away from a track position. Thus, the Tracking Error Signal may be used to adjust the radial position of the spot so that it lies directly above the track. The Tracking Error Signal indicates how much radial adjustment is needed.

The Clock Marks shown in FIG. 1 are used as synchronization marks to indicate (via timing provided by a Phase Lock Loop) where other marks are on the track, thus providing "capture". Each Clock Mark lies directly on a track; thus, when the laser spot is located radially above a track, the signal from the Clock Mark is a maximum.

The Clock Marks and the Tracking Marks are used to generate a second "Cosine Signal," as also shown graphically in FIG. 1. The Cosine Signal graph shown in FIG. 1 is the difference of twice the Clock Mark signal strength minus the sum of the signals of the tracking marks (2C−(A+B)) as a function of radial position of the laser spot. The Cosine Signal is a maximum when the spot is over a track and a minimum exactly between tracks. Thus, the Cosine Signal is 90° out of phase with the Tracking Signal Error.

The Cosine Signal is typically used for deriving the direction of motion of the laser spot during seeks at low radial velocities. A "seek" is where the laser spot is deliberately moved in the radial direction from one track to another. A seek occurs at low velocity when the movement is only over one or a few tracks; thus the velocity of the spot in the radial direction is low. Alternatively, a low velocity seek occurs at the end of a longer multi-track seek. In the middle of such a longer seek, the radial velocity is greater and is then slowed in order to capture the desired track at the end of the seek.

In both cases, determining the direction of motion of the laser spot (referred to alternatively as the "head", which projects the spot) is made difficult by the eccentricity of the tracks relative to the center of the disc. This eccentricity can indicate movement of the head moving in a different direction or at a different speed than it actually is.

Thus, the direction of motion of the optical head (relative to the tracks) is unpredictable at low velocities. The Cosine Signal is used in conjunction with the Tracking Error Signal to provide an accurate determination of the direction of motion. For example, referring to FIG. 1, when the head is moving in the positive radial direction (away from the center of the disc), the leading edge of the digitized Cosine Signal (shown in dashed lines) always occurs when the Tracking Error Signal is positive. Conversely, when the head is moving in the negative radial direction (toward from the center of the disc), the leading edge of the digitized Cosine Signal occurs when the Tracking Error Signal is zero.

Accordingly, if the digitized Tracking Error Signal is used as the input to a flip-flop, with the digitized Cosine Signal used as the gate signal, then movement of the head in the positive radial direction would be indicated by a positive (+1) output of the flip-flop. Movement of the head in the negative radial direction will be indicated by a zero output of the flip-flop.

The tracking format of FIG. 1 presents a number of disadvantages. First, if the pitch of the track (i.e., the space between tracks) is large, or the laser spot is relatively small, the Clock Marks can be missed during seeks. This can cause loss of synchronization, especially when older media having larger pitch is used in future drives having smaller laser spots.

Second, future media will use ever decreasing track pitches. As the track pitch for the media of FIG. 1 is reduced, each track mark moves closer to the neighboring adjacent track. For example, the "B" mark from Track N+2 will approach Track N+3, resulting in larger noise when reading the B mark while tracking at Track N+3. (Of course, an increase in noise will also occur at the A mark on Track N+3 from Tracking Mark A on Track N+4.) Thus, the use of the format of FIG. 1 in future media will suffer as resolution between adjacent A marks and B marks is reduced, resulting in a poor signal to noise ratio in both the Tracking Error Signal and Cosine Signal. In effect, the format limits the track density of the media.

Third, during long seeks, when moving across a large number of tracks, it is desirable to have the head move at a high velocity for much of the seek, in order to minimize the time delay. In some systems, the Tracking Error Signal is sampled in order to count tracks as the spot moves in the radial direction. However, it is seen that the Tracking Error Signal of FIG. 1 completes one complete cycle for each track. This relatively high frequency signal limits the radial seek velocity of such systems; if the spot moves too fast, the signal from an adjacent cycle can give rise to detection of an "alias" signal from an adjacent cycle of the signal, rendering the count of track crossings inaccurate.

Finally, the Tracking Marks in FIG. 1 are not located on the track. Manufacture of such "off-track" marks is more difficult and costly than on-track marks (such as the Clock Marks in FIG. 1).

A number of the difficulties presented by the format of the media of FIG. 1 are improved with the format of the media represented in FIG. 2, which is a segment of the media analogous to that shown in FIG. 1. The format is representative of the one used in the LM6000 media of Philips Laser and Magnetic Storage. Again for the four tracks N to N+3 shown in FIG. 2, the center of the disk is above Track N. As shown in FIG. 2, the media would spin in a clockwise direction about the center; thus, the segment shown in FIG. 2 is envisioned moving from right to left on the page.

The radial position of tracking marks A and B alternate from one side of the track to the other for neighboring tracks. Thus, the B mark for Tracks N and N+1 are both located between Tracks N and N+1. The A marks for Tracks N+1 and N+2 are both located between Tracks N+1 and N+2. Thus, the mark of an adjacent track cannot encroach closer than the tracking mark for the track itself, thus limiting the noise.

The Tracking Error Signal graph again represents the difference of signal strengths of the tracking marks (A–B) versus radial position of the laser spot. Again, the Tracking Error Signal is zero when the laser spot is located exactly over a track and increases in magnitude (in a positive or negative direction) as it moves radially away from a track position. Thus, the Tracking Error Signal may be used to adjust the radial position of the spot so that it lies directly above the track. The Tracking Error Signal indicates how much radial adjustment is needed.

Because the A and B tracking marks are "grouped" on the same side between neighboring tracks, it is seen that the Tracking Error Signal reaches a single maxima or a minima at the half-way point between tracks. The frequency of the Tracking Error Signal is one-half that of the format of FIG. 1. Thus, for systems that use the tracking signal to count tracks during a long seek, the format of FIG. 2 allows the head to move at a higher velocity without an aliasing.

Also shown in the format of FIG. 2 are separate Cosine Marks on each track, located at two tangential positions C and D. The position of the Cosine Marks for adjacent tracks alternate between positions C and D and thus give a Cosine Signal as shown in FIG. 2 that is likewise 90° out of phase with the Tracking Error Signal. In the same manner as explained above with respect to the format of FIG. 1, the Cosine Signal is used in conjunction with the Tracking Error Signal to determine the direction of motion of the head.

Finally, the format of FIG. 2 shows Clock Marks located both on track and between tracks. Having a tracking mark between tracks serves to prevent loss of synchronization for smaller spots and/or large track pitches.

The format of FIG. 2 also has a number of disadvantages. Although the position of the tracking marks serves to reduce noise for neighboring tracks, the pitch of the media still cannot be reduced indefinitely. Although the marks no longer encroach directly on neighboring tracks (as in FIG. 1), a reduction in pitch for the grouping of track marks in FIG. 2 leads to encroachment on adjacent marks. This again gives rise to noise. More fundamentally, it limits the amount the pitch may be reduced, since adjacent track marks will begin to merge.

Further, both the tracking marks and half of the clock marks are off-axis for the format. As already noted, this type of off-axis formatting is both difficult and expensive.

SUMMARY OF THE INVENTION

It is thus an objective of the invention to create a method of formatting and a format for the servo field of an optical disc that eliminates the need for off-track marks. It is also an objective to provide a system for reading and processing the format. It is also an objective of the invention to create a method of formatting and a format for the synchronization marks of an optical disc that lie entirely on-track, but can be used in detecting and correcting the position of an optical beam that has deviated to a position between tracks.

The invention provides a method of formatting and a format for the servo field of an optical disc using on-track marks. The format uses a mark that is oblong, i.e., wider in the direction perpendicular to the track. For example, in one embodiment the marks have an elliptical shape centered on the track, with the long axis perpendicular to the track (for an optical disc, in the radial direction).

The oblong shape of the marks in the servo field, as well as their alignment, extend the mark into the region between tracks. Thus, an optical beam tracking a particular track will detect the servo field marks of adjacent tracks. (This detection of marks in the servo field of adjacent tracks is referred to as "cross-talk".)

The signals created by the cross-talk of tracking marks from adjacent tracks surrounding the track under consideration can be processed in a system according to the present invention to give an indicia of the tracking error of the optical beam.

According to the invention, an optical recording medium having a number of adjacent tracks for storing digital optical information is provided, such as an optical disc. The tracks extend in a tangential direction, for example, surrounding the center of the disc. Each track is separated by a pitch amount in a radial direction, for example, outward from the center across the tracks.

The tracks each have a servo field comprising one tracking mark located on the track in one of four discrete tangential positions A, B, C and D on the track. There is a mark in one of these four positions for every four adjacent tracks on the media. The position of the tracking marks repeat in the same sequence for every four adjacent tracks.

For any four such adjacent tracks, the tracks having marks at positions A and B are separated by one track, and tracks having marks at positions C and D are separated by one track.

For example, beginning (arbitrarily) with a track having a mark at position A, the sequence of the four adjacent tracks can be A,C,B,D. (When one of the other tracks is selected first, it is seen that this sequence is the same as C,B,D,A; B,D,A,C; and D,A,C,B.) It could also be A,D,B,C (which is equivalent to D,B,C,A; B,C,A,D; and C,A,D,B). All such sequences repeat for subsequent tracks on the media.

When read, the optical recording medium so described creates two tracking error signals that are 90 degrees out of phase. The first tracking error signal is based by the difference of signal strength at positions A and B for radial positions on the disc. Moving radially on the media, the first tracking error signal will go through a maxima where A is the on-track signal and a minima where B is the on-track signal. Since on-track signals A and B are separated by a track, the first tracking error signal will pass through zero as it crosses a track having on-track marks at positions C and D. Thus, the first tracking error signal may be used as an indicia of the needed radial correction when reading tracks having on-track marks at positions C and D. Also, first tracking error signal completes a cycle every four tracks.

The second tracking error signal is based by the difference of signal strength at positions C and D for radial positions on the disc. Moving radially on the media, the second tracking error signal will go through a maxima where C is the on-track signal and a minima where D is the on-track signal. Since on-track signals C and D are separated by a track, the second tracking error signal will pass through zero as it crosses tracks having on-track marks at positions A and B. Thus, the second tracking error signal may be used as an indicia of the needed radial correction when reading tracks having on-track marks at positions A and B. Also, second tracking error signal completes a cycle every four tracks.

(First tracking error signal may alternatively be based upon the difference of signal strength B−A, which creates maxima at the B position and minima at the A position, thus shifting the signal by 180°. Likewise, second tracking error signal may alternatively be based upon the difference of signal strength D−C, which creates maxima at the on-track D position and minima at the on-track A position, thus shifting the second signal by 180°.)

The first and second tracking error signals are, by definition, 90° out of phase. The signals are thus well suited for determining the direction of movement of the laser spot following seeks.

A system for adjusting the tracking of a track of the optical recording medium described above is also included. The optical system comprises an optical signal processor for generating a signal from the track being read. The optical system also includes first signal processing electronics that determines a first error signal based on the difference in signal strength from the media at positions A and B when reading a track. The signal is then used to determine the radial error signal if the track being read has an on-axis mark at position C or D. The optical system also includes second signal processing electronics that determines a second error signal based on the difference in signal strength from the media at positions C and D when reading a track. The signal is then used to determine the radial error signal if the track being read has an on-axis mark at position C or D.

BRIEF DESCRIPTION OF THE DRAWINGS

For better understanding of the invention, reference is made to the following drawings which are to be taken in conjunction with the detailed description to follow.

DETAILED DESCRIPTION

Figure 2:
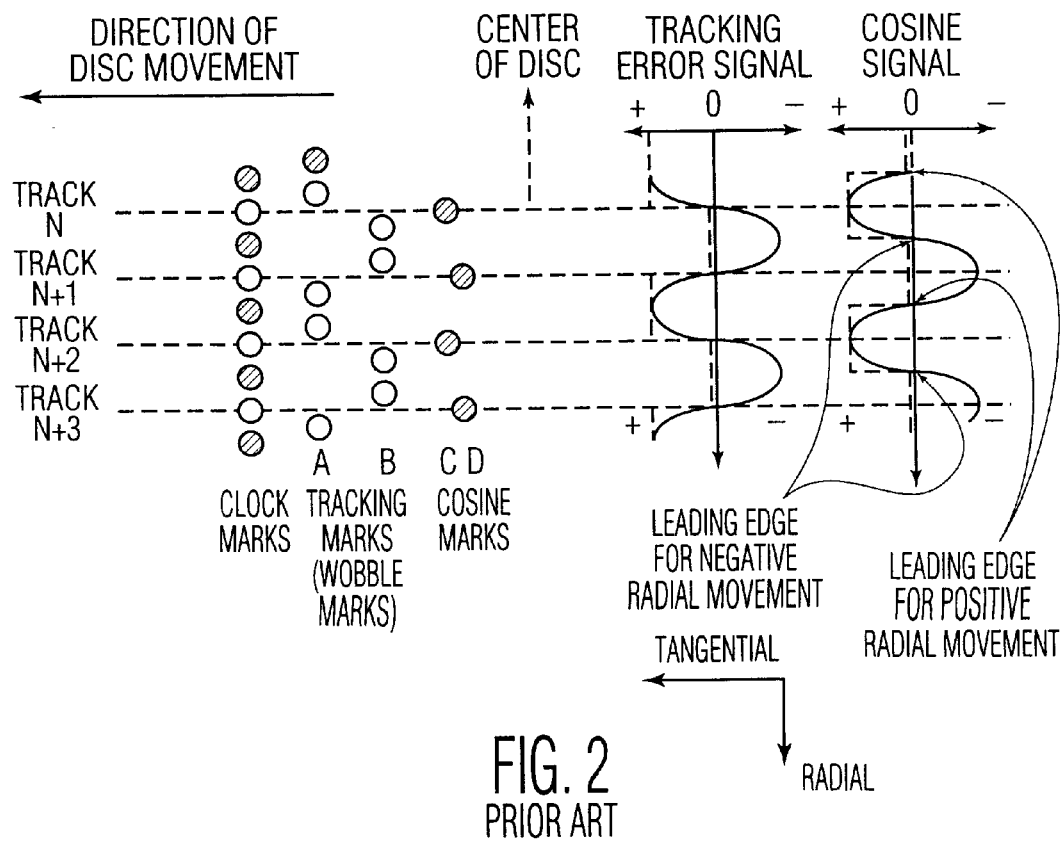
FIG. 2 is a representative drawing of a segment of a second prior art format of a servo field of an optical disc along with graphs of signals generated from optical scanning of that disc.
Figure 3:
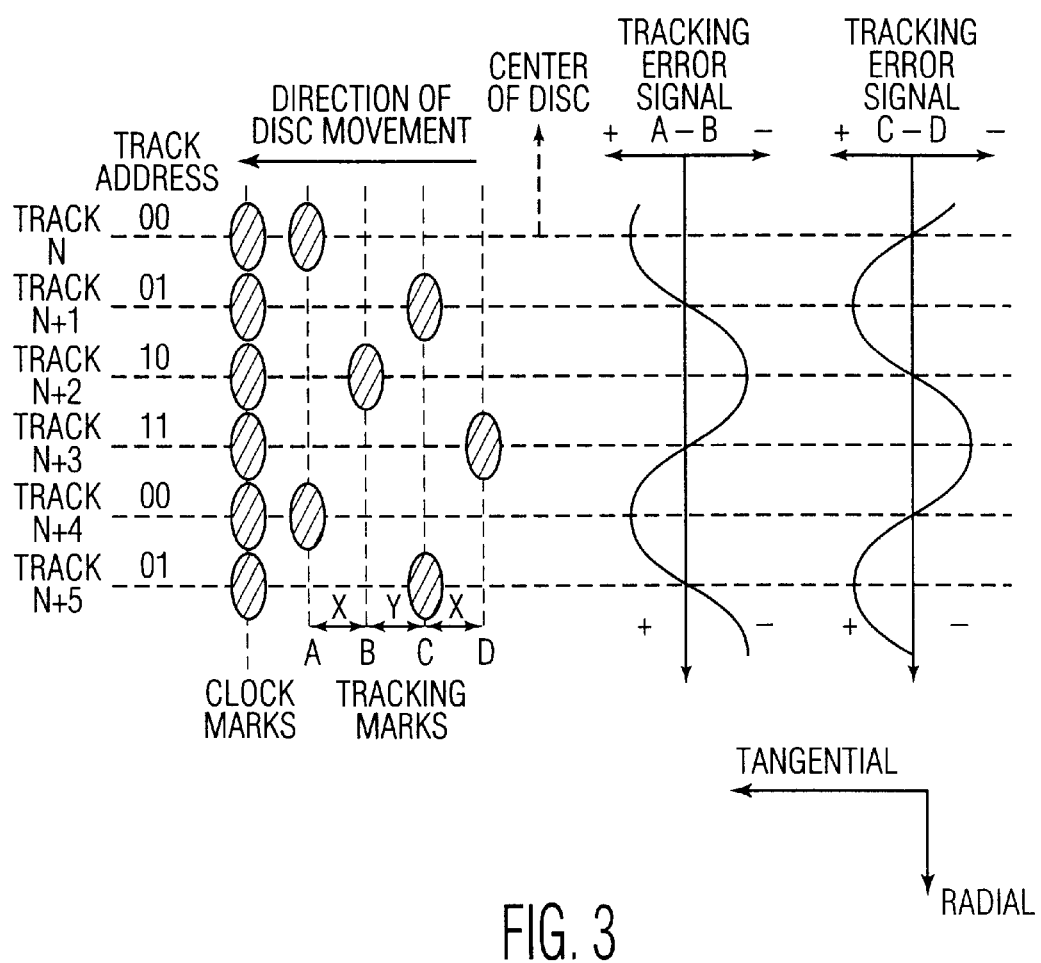
FIG. 3 is a representative drawing of a segment of the format of a servo field of an optical disc according to the present invention, along with graphs of signals generated from optical scanning of that disc.

Referring to FIG. 3, a representative embodiment of a format for a servo field of an optical disc in accordance with the present invention is shown. As seen, all marks are in the shape of an oval or ellipse, with the long axis of the ellipses aligned perpendicular to the tracks (in the radial direction). All marks are also centered on the tracks; no marks lie between tracks, as some (or all) do in FIGS. 1 and 2.

Focusing on the tracking marks of the servo field in FIG. 3, on each track there is one tracking mark located on-track. The on-track tracking mark is located in one of four positions on the track, designated A, B, C or D. The tangential distance between positions A and B is the same as the tangential distance between positions C and D and is labeled "X" in FIG. 3. The tangential distance between positions B and C (labeled "Y") is slightly greater than X.

Six tracks, N to N+5, are shown in FIG. 3. The tracking marks repeat in a pattern A, C, B, D moving radially toward the center of the disc. Thus, tracks N and N+4 (and tracks N+8, etc., not shown in FIG. 3) have a tracking mark at position A; tracks N+1 and N+5 (and tracks N+9, N+13, etc., not shown in FIG. 3) have a tracking mark at position B; track N+2 (and tracks N+6, N+10, etc., not shown in FIG. 3) has a tracking mark at position C; and track N+3 (and tracks N+7, N+11, etc., not shown in FIG. 3) has a tracking mark at position D.

Figure 1:
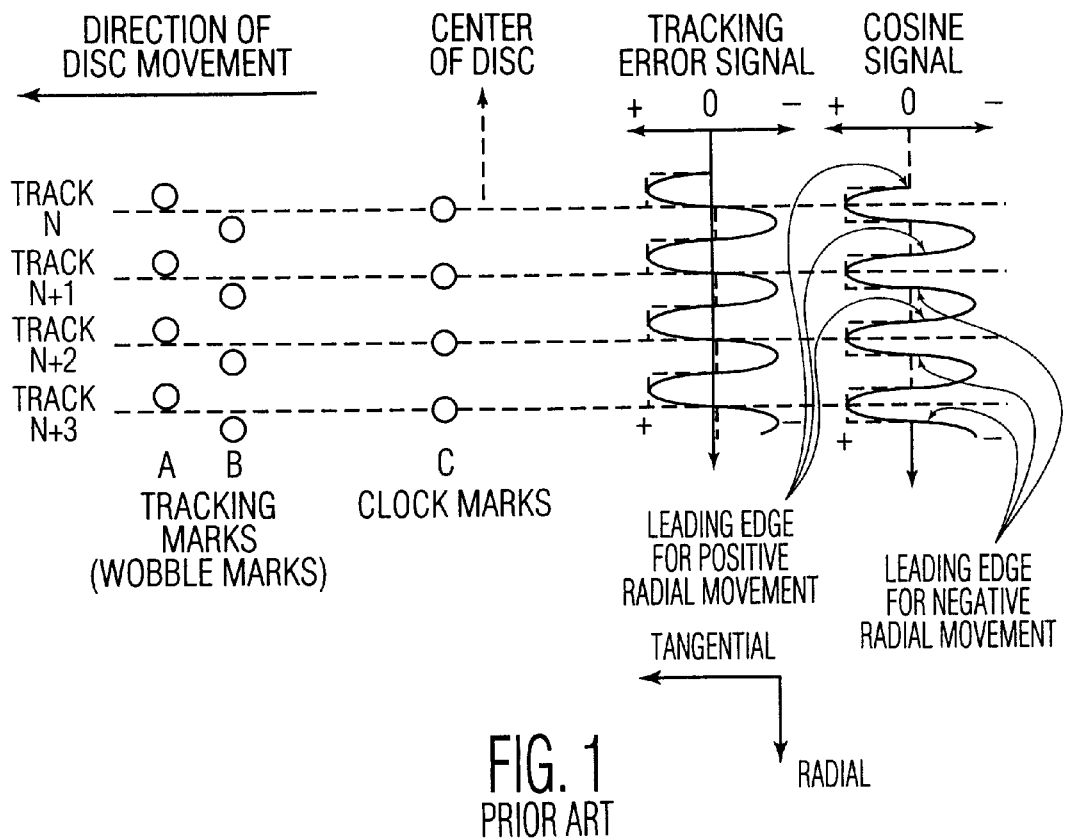
FIG. 1 is a representative drawing of a segment of a prior art format of a servo field of an optical disc along with graphs of signals generated from optical scanning of that disc.

As noted the radial position of the tracking marks is located on the track, not in-between them as in FIGS. 1 and 2. Moreover, the closest tracking mark having the same tangential position is four tracks away. Thus, the track pitch can be reduced significantly without creating excessive noise at the track.

The oblong shape of the tracking marks gives rise to "cross-talk". Thus, a tracking mark at one tracking position will be detected when reading that position on an adjacent track. For example, when reading track N+2, a signal would be read at tracking mark positions C and D from the cross-talk from the tracking marks at adjacent tracks N+1 and N+3 respectively. Similarly, when reading track N+3, a signal would be read at tracking mark positions A and B from the cross-talk from the tracking marks at adjacent tracks N+4 and N+2 respectively.

The format of FIG. 3 is used to generate two separate Tracking Error Signals. The first Tracking Error Signal (labeled in FIG. 3 as "Tracking Error Signal A–B") represents the difference of signal strengths at tracking positions A and B versus radial position of the laser spot. The second Tracking Error Signal (labeled in FIG. 3 as "Tracking Error Signal C–D") represents the difference of signal strengths at tracking positions C and D versus radial position of the laser spot.

Tracking Error Signal A–B reaches a maxima when the laser spot is located above a track where the tracking mark is located at the A position (i.e., tracks N and N+4 in FIG. 3) and is a minima when the laser spot is located above a track where the tracking mark is located at the B position (i.e., track N+2 in FIG. 3). Thus, Tracking Error Signal A–B has a cycle every four tracks.

In between maxima and minima of A–B, i.e., when the laser spot is over tracks N+1, N+3 and N+5, Tracking Error Signal A–B is zero. For these tracks, tracking mark C or D is the on-track mark and the signal read at positions A and B arise from the cross-talk of adjacent (above and below) tracks. When reading tracks N+1, N+3 and N+5, the cross-talk from adjacent tracks are equal in magnitude, so Tracking Error Signal A–B is zero.

Thus, Tracking Error Signal A–B may be used to adjust the radial position of the spot so that it lies directly above the track when reading tracks N+1, N+3, N+5, etc. The magnitude of Tracking Error Signal A–B indicates how much radial adjustment is needed. Whether Signal A–B is positive or negative determines the direction of radial correction.

For example, for reading Track N+3, if Tracking Error Signal A–B is positive, then the head is below the track (closer to Track N+4) and the correction is in the negative radial direction. For reading Tracks N+1 and N+5, if Tracking Error Signal A–B is positive, then the head is above the track (closer to Tracks N and N+4) and the correction is in the positive radial direction.

Likewise, Tracking Error Signal C–D reaches a maxima when the laser spot is located above a track where the tracking mark is located at the C position (i.e., tracks N+1 and N+5 in FIG. 3) and is a minima when the laser spot is located above a track where the tracking mark is located at the D position (i.e., track N+3 in FIG. 3). As seen, Tracking Error Signal C–D also has a cycle every four tracks. In between maxima and minima, i.e., when the laser spot is over tracks N, N+2 and N+4, Tracking Error Signal C–D is zero. For these tracks, tracking mark A or B is the on-track mark and the signal read at positions C and D are from the cross-talk of adjacent (above and below) tracks. When reading these tracks, the cross-talk from adjacent tracks are equal in magnitude, so Tracking Error Signal C–D is zero.

Thus, Tracking Error Signal C–D may be used to adjust the radial position of the spot so that it lies directly above the track when reading tracks N, N+2 and N+4. Tracking Error Signal C–D indicates how much radial adjustment is needed and in which direction.

Using tracking marks in one of four positions, as in FIG. 3, is especially suited for media that uses a binary addressing system. In a binary addressing system each track is designated with a track address (via marks in an address field) with the two least significant bits being 00, 01, 10 or 11. Tracks are designated in succession and the designations repeat every four tracks. Thus, referring to FIG. 3, Track N corresponds to track address with least significant bits 00, Track N+1 to address with least significant bits 01, Track N+2 to address with least significant bits 10 and Track N+3 to address with least significant bits 11. At that point, the two least significant bits of the track addresses repeat: Track N+4 has track address 00, Track N+5 has track address 01, Track N+6 would have track address 10 and Track N+7 would have track address 11. (For convenience, reference simply to a "track address" followed by a binary number will be understood to refer to the two least significant bits of the track address.) The address sequence would continue to repeat for every four tracks.

All tracks having the same on-track tracking mark will have the same address. Thus, for FIG. 3, all tracks having on-track mark at position A have address 00; all tracks having on-track mark at position C have address 01; all tracks having on-track mark at position B have address 10; and all tracks having on-track mark at position D have address 11.

The binary address system is useful for facilitating the tracking. As described above, Tracking Error Signal A–B is used for tracking tracks having on-track mark C and D, which have addresses 01 or 11 in FIG. 3. Tracking Error Signal C–D is used for tracking tracks having on-track mark A and B, which have addresses 00 or 10 in FIG. 3. Thus, for the address designations of FIG. 3, when an odd track address is read, Tracking Error Signal A–B is used. When an even track address is read, Tracking Error Signal C–D is used.

Figure 4:
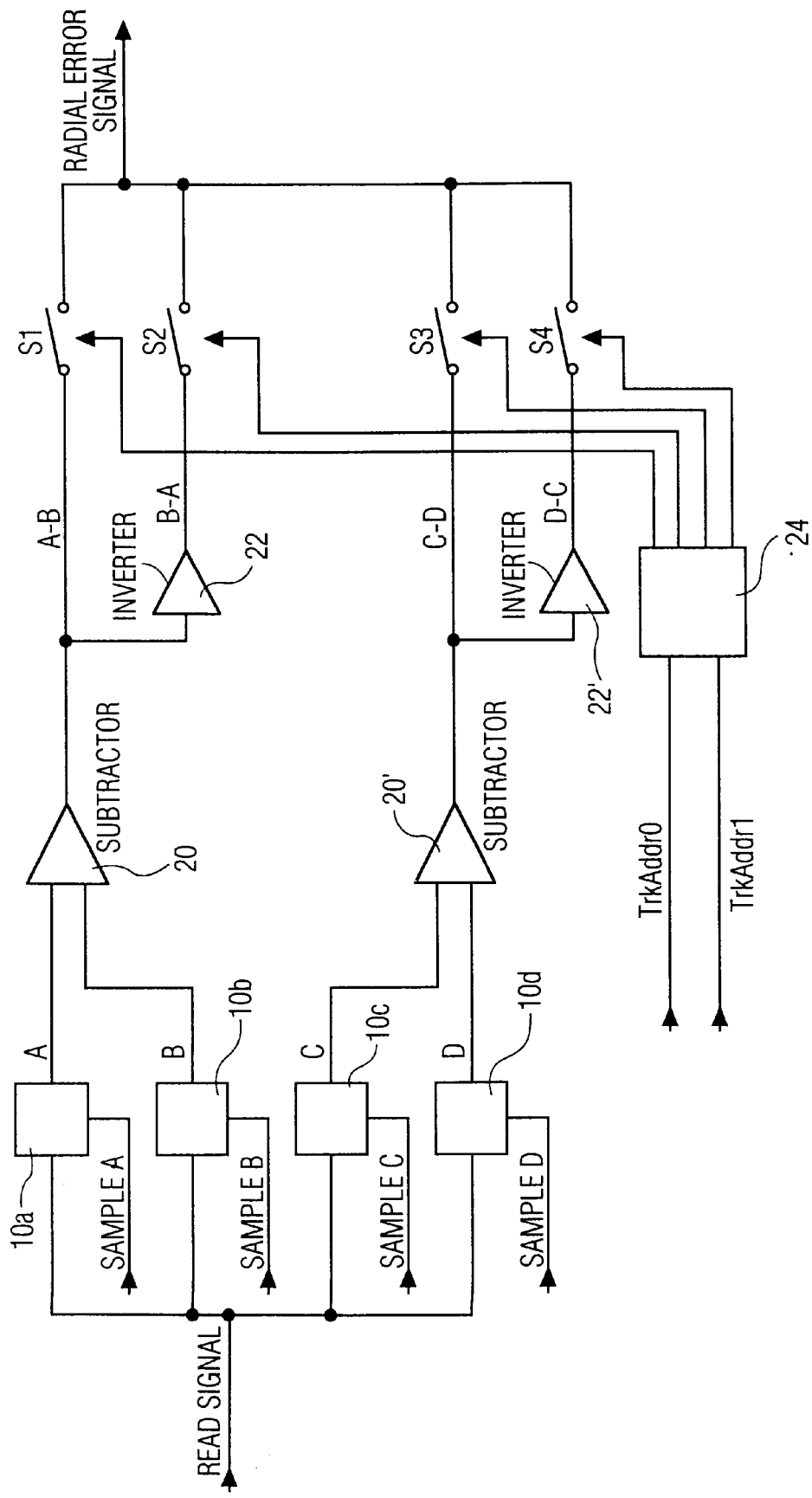
FIG. 4 is a schematic diagram of the electronics used in a system for determining a radial error signal for a track having the format of FIG. 3.

(The designation of track addresses for the tracking mark positions shown in FIG. 3 is not unique. Any of the four address can correspond to any one of the four tracking mark positions. Once such an initial assignment is made, the addressing must repeat in order for each four tracks in succession. For example, track address 00 could correspond to position C, address 01 could correspond to position B, address 10 could correspond to position D and address 11 could correspond to position A. In that case, odd addresses would use Tracking Error Signal C–D and even addresses would use Tracking Error Signal C–D.) FIG. 4 gives a particular embodiment of the electronics used in a system that processes the signal read from a track in order to obtain the appropriate radial error signal that is sent to the servo-loop to adjust the tracking. The electrical signal that is generated by the optical signal reading a track (designated the "read signal" in FIG. 4) is sampled at points A, B, C and D on the track. The sampled signals are stored in separate sample and hold devices 10a, 10b, 10c, 10d.

The samples of signals A and B become inputs for subtractor 20. Thus, the output of subtractor 20 is A–B, which is the signal at switch S1. The signal A–B outputted from subtractor 20 is also divided and inverted at inverter 22. Thus, the signal at switch S2 is B–A.

Likewise, the samples of signals C and D become inputs for subtractor 20'. Thus, the output of subtractor 20' is C–D, which is the signal at switch S3. The signal C–D outputted from subtractor 20' is also divided and inverted at inverter 22'. Thus, the signal at switch S4 is D–C.

The signal that is sent on to the servo loop as the radial signal error is determined by the One of Four Decoder 24. The drive controller provides the input signals to the One of Four Decoder 24, which are the two least significant bits of the track address of the track that is to be accessed.

In one instance, the drive controller supplies the input to the decoder following a long seek. The drive controller may monitor the addresses of the tracks it is passing over during a long seek. Once the head is over the sector (group of four tracks) that has the track being sought, the drive controller inputs the two least significant bits of the track address into the One of Four Decoder. As explained below, this serves to close the appropriate switch S1, S2, S3 or S4, thereby closing the tracking loop with the selected radial signal.

In another situation, the tracking does not follow a seek; that is, the head is simply reading sequential tracks of a sector of the disc. In this case, the track address is read and the drive controller supplies the two least significant bits of the track address to the input to the One of Four Decoder 24. As explained below, this again serves to close the appropriate switch S1, S2, S3 or S4, thereby closing the tracking loop with the selected radial signal.

Referring back to FIG. 3, if the two least significant bits of the track address supplied to the decoder is 00 (on-track mark A), then C–D is the proper radial error signal. (Again, for convenience, the two least significant bits of a track address that is supplied to the decoder may be referred to simply as the "track address.") A positive value of C–D adjacent track 00 indicates the laser spot is off track in the positive radial direction, toward adjacent track 01. A negative value of C–D adjacent track 00 indicates that the laser spot is off track in the negative radial direction, toward adjacent track 11. Thus, decoder 24 will close switch S3 for input address 00.

Similarly for the addressing of FIG. 3, B–A is the radial error signal used for track addresses 01; a positive value indicates that the laser spot is off track in the positive radial direction, toward adjacent track 10, whereas a negative value indicates that the laser spot is off track in the negative radial direction, toward adjacent track 00. Likewise, D–C is the proper radial error signal for track addresses 10 and A–B is the proper radial error signal for track addresses 11.

Accordingly, decoder 24 would close switch S2 when input 01 is supplied; close switch S4 when input 10 is supplied; and close switch S1 when input 11 is supplied.

The tracking format of FIG. 3 is also well suited for a short seek to an adjacent track. The desired track address can be sent to decoder 24, which closes the switch that will send the radial error signal for the adjacent track on to the servo loop. Thus, the laser spot will be moved radially to the desired track.

It is seen that Tracking Error Signal A–B has a frequency that is half that of the format of FIG. 2 and one quarter that of the format of FIG. 1. Thus, for systems that use the tracking signal to count tracks during a long seek, the format of FIG. 3 allows the head to move at a still higher velocity without creating an alias signal. (Tracking Error Signal C–D has the same frequency and could alternatively be used to maintain the head velocity during seeks.) For the format shown in FIG. 3, it is seen that Tracking Error Signal C–D is 90° out of phase with Tracking Error Signal A–B. Thus, Tracking Signal Error C–D can serve as the Cosine Signal for Tracking Signal A–B, in order to determine the direction of motion of the head during seeks. This is discussed in more detail with respect to FIGS. 5–8 below.

Figure 5:
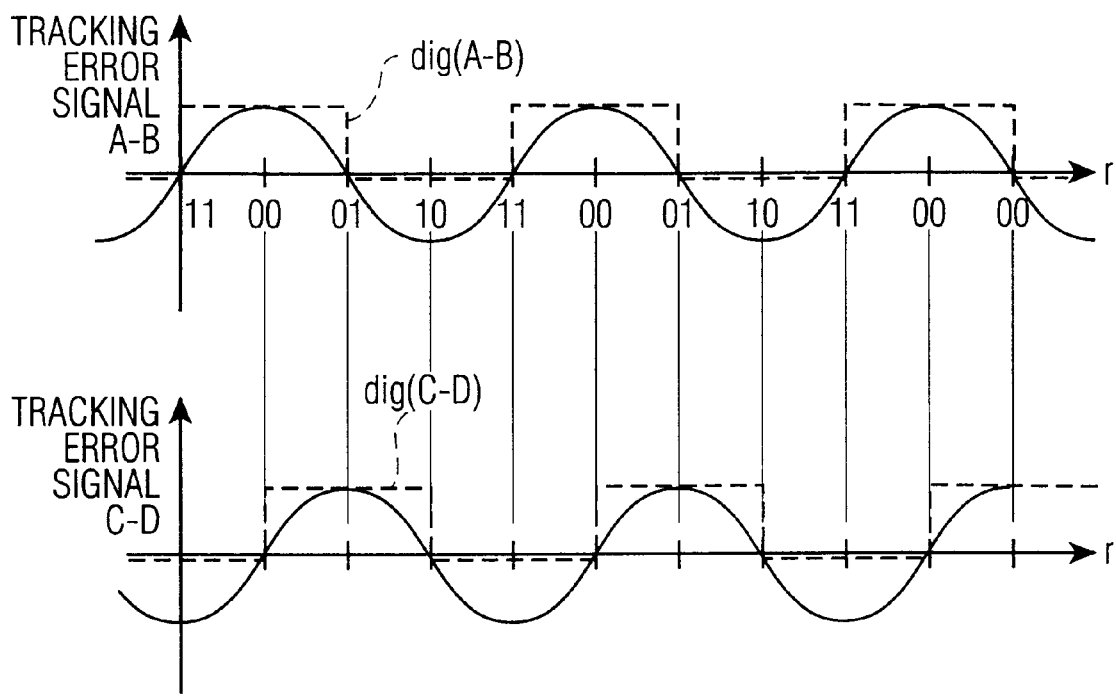
FIG. 5 are graphs of signals generated from optical scanning of a disc having the format shown in FIG. 3.

FIG. 5 re-casts the tracking error signal graphs of FIG. 3 horizontally, and extended further in the radial direction. The horizontal axis also indicates the track addresses. Shown in dashed lines for each Tracking Error Signal is the digitized Tracking Error Signal. (Digitized Tracking Error Signal A–B will be referred to as "dig(A–B)" and digitized Tracking Error Signal C–D will be referred to as "dig(C–D".)

Figure 6:
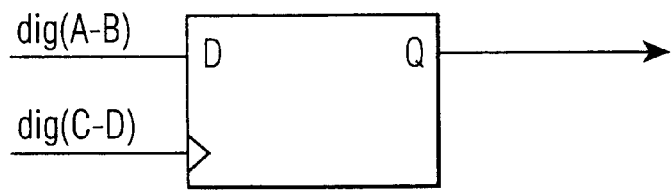
FIG. 6 is a schematic diagram of electronics used in a system for determining the radial movement of a head when reading a disc having the format shown in FIG. 3.

FIG. 6 is a simple circuit for determining the direction of motion of the head using dig(A–B) and dig(C–D). In FIG. 6, dig(A–B) is the input of a flip-flop, and dig(C–D) is used as the clock signal. If the head is moving in a positive radial direction, then the edge of dig(C–D) at radii corresponding to track address 00 will update the flip flop. At radii for track addresses 00, dig(A–B) is 1, so the output of the flip-flop (Q) will be 1 when the head is moving in the positive radial direction.

Similarly, if the head is moving in the negative radial direction, then the edge of dig(C–D) corresponding to tracks at radii 10 will cause the update. At 10, dig(A–B) is 0, so the output of the flip-flop (Q) will be 1 when the head is moving in the positive radial direction.

Figure 7:
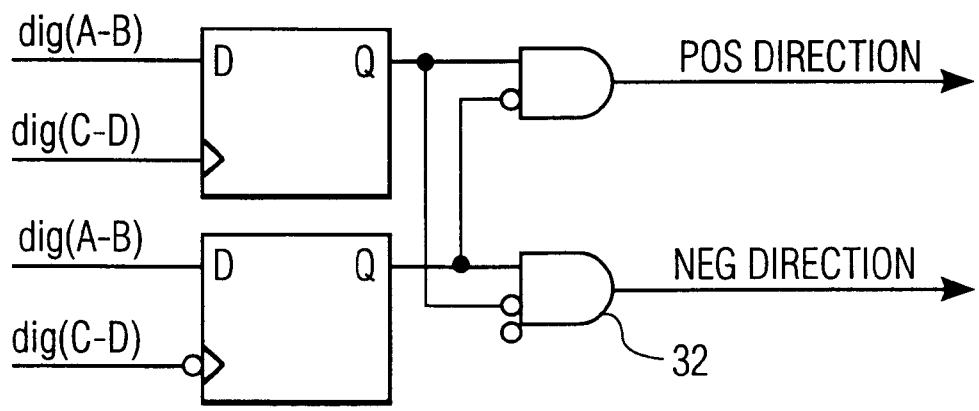
FIG. 7 is a schematic diagram of alternate electronics used in a system for determining the radial movement of a head when reading a disc having the format shown in FIG. 3.

However, because the flip-flop of FIG. 6 is only updated for rising edges, the head may have to move across as many as four tracks before an update provides a correct indication of direction of motion. FIG. 7 provides an improved circuit for detecting motion. For the circuit of FIG. 7, the output of AND gate 30 is 1 and the output of AND gate 32 is 0 when the head is moving in the positive radial direction. The output of AND gate 30 is 0 and the output of AND gate 32 is 1 when the head moves in the negative radial direction. The output is updated at both the rising and falling edges of dig(C–D), thus more frequently than for the circuit in FIG. 6.

In FIG. 7, however, both outputs may be 0 when there is a change of direction. This state would not be updated until the next edge, or a radial distance of two tracks. Thus, for a change of direction just prior to an edge, the spot might have to move a radial distance of close to four tracks before the output of FIG. 7 accurately reflects the direction.

Figure 8:
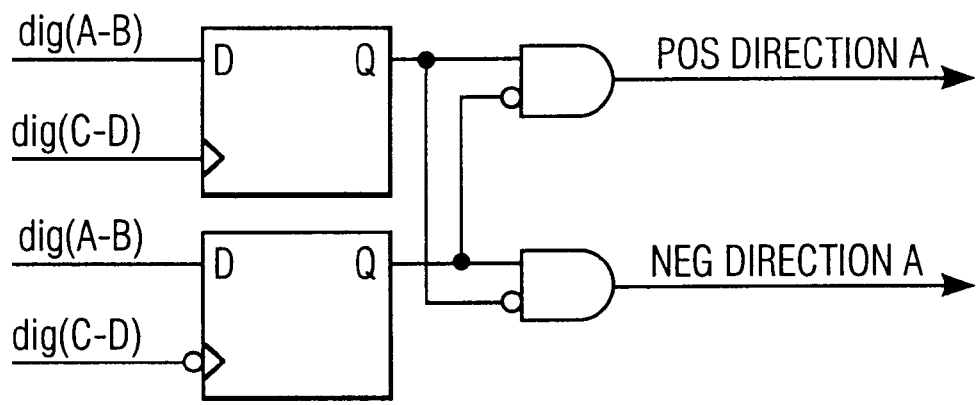
FIG. 8 is a schematic diagram of alternate electronics used in a system for determining the radial movement of a head when reading a disc having the format shown in FIG. 3.
Figure 8:
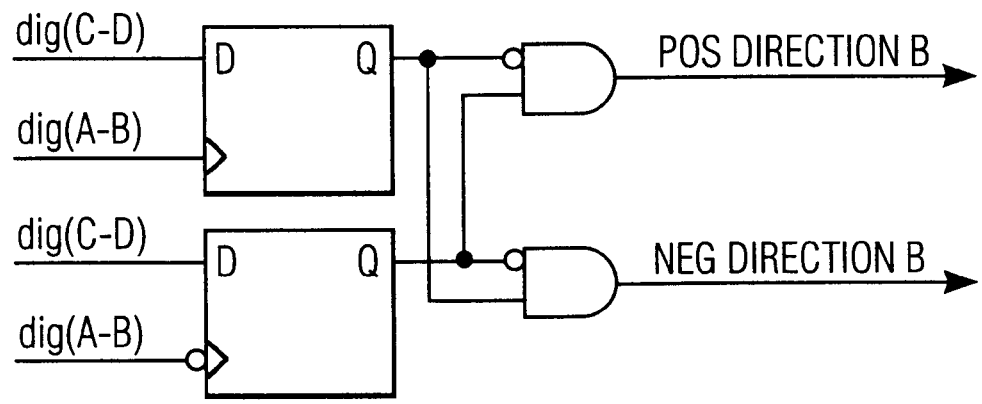

FIG. 8 provides another improved circuit for detecting the head motion. For the circuit of FIG. 8, when the head is moving in the positive radial direction, the outputs "Pos Direction A" and "Pos Direction B" are both 1. When the head is moving in the negative radial direction, then the outputs designated "Neg Direction A" and "Neg Direction B" are both 1. Because the edges of both signals are used, when the direction reverses, one of the outputs will change to a zero at the first track crossing. Thus, the circuit of FIG. 8 provides an accurate indication of head motion within one track width.

It should also be noted that the format of FIG. 3 can also be used to servo the spot in between tracks. For example, to track between Tracks N and N+1 (track addresses 00 and 01), a tracking error signal A–C could be used. Similarly, signal C–B could be used for tracking in between tracks 01 and 10; signal B–D could be used for tracking in-between tracks 10 and 11; and signal D–A could be used to track in between tracks 11 and 00.

The existing Tracking Error Signals A–B and C–D could also be combined for such in between tracking. For example, exactly in between tracks 00 and 01, Tracking Error Signals A–B and C–D have the same magnitude; thus, to track in between tracks 00 and 01, the signal (A–B)–(C–D), which equals zero between tracks, can be used. Similarly, (A–B)+(C–D) can be used to track in between tracks 01 and 10, since sum is zero exactly in between tracks. Other sums can likewise be constructed for the other two pairs of track addresses.

Finally, again referring back to the format of FIG. 3, it is seen that the Clock Marks are also oblong or ellipsoidal in the radial direction. Thus, when the laser spot is off-track, the cross talk of the Clock Mark from adjacent tracks will be detected, thus reducing or eliminating the instances of loss of synchronization.

The ellipses should have a sufficiently high aspect ratio to provide adequate cross-talk. The necessary amount of cross-talk is related to the signal-to-noise ("SNR") of the optical disc or system.

Typically, a data mark on a track of optical recording media has an SNR on the order of 50 dB (for a measured bandwidth ("BW") on the order of 30 kHz). Further, the permitted cross-talk from a data mark on an adjacent track is on the order of −32 dB relative to the signal of a mark that lies on the track.

The SNR of the cross-talk is the ratio of the cross-talk signal strength to the background (media) noise on the track. It follows from the above that the SNR of the cross-talk is on the order of 18 dB.

Presuming that the tracking marks have a comparable size to the data marks, an SNR of 18 dB is considered inadequate for reliable tracking, where the tracking servo and system must follow the track with an accuracy of about 5% of the trackpitch. Reduction of the trackpitch is one conceivable design option to raise the SNR of cross-talk from the tracking marks for the tracking servo, but would also raise cross-talk from data marks to an unacceptable level.

An SNR for the cross-talk of tracking marks on the order of 30 dB or greater (for a measured BW on the order of 30 kHz) is preferable for reliable tracking by the tracking servo. Thus, using the parameters given above, the cross-talk from the tracking marks must be −20 dB with respect to the signal of an on-track mark, or, equivalently, the cross-talk must be 10% (or more) of the on-track mark.

As an example of how these concepts translate into the configuring of a particular ellipse size for a tracking mark, for circular data marks having a diameter of approximately 660 nm and a track pitch of approximately 850 nm, the radial width of the mark in the radial direction must be expanded to approximately 1050 nm or more in order to achieve a 10% cross-talk. Using these two dimensions, 660 nm tangential width and 1050 nm radial width, translates into an ellipse having an aspect ratio of approximately 1.59. Of course, since the 1050 nm is a minimum width, the aspect ratio can be greater than 1.59. For example, a prudent design would have tracking marks with an aspect ratio of 1.8.

The marks in the servo field do not necessarily have to be ellipsoidal. Any shape is acceptable provided it extends sufficiently into the region between tracks to provide for sufficient cross-talk. Thus, the signals could conceivably be rectangular, or even over-sized circles. (However, if the tracking marks were circular that would raise the overhead, because the marks would have to separated more in the tangential direction, in order to provide adequate tangential resolution.) As noted above, the radial expanse of the mark typically should be sufficient to provide an SNR of approximately 30 dB or greater for the cross-talk signal. For typical SNR of an optical media, a sufficient amplitude for the cross-talk signal is 10% (or more) of the on-track mark amplitude.

While other shapes for the marks would provide sufficient cross-talk, the ellipsoidal shape having the long axis oriented in the radial direction is currently the preferred embodiment. The short axis oriented in the tangential direction (i.e., along the track) is desirable for good tangential resolution (i.e., greater separation between signals generated by the on-track marks) and for a low format overhead (i.e., the amount of tangential space needed to accommodate the servo field).

Moreover, creation of marks having an ellipsoidal or near-ellipsoidal shape is straight-forward. Index guided semiconductor lasers, for example, are notorious for radiating an elliptical beam. Optical recording devices usually employ optics to reduce the ellipticity of the spot at the recording medium (although many such optics cannot completely eliminate the ellipsoidal shape, thus creating marks that are slightly ellipsoidal.) By eliminating such optics, or by adding features that will enhance the ellipticity of the beam, a sufficiently high aspect ratio can be easily achieved and can thus be used for servo-writers.

For mastering equipment for pre-formatting masters/stampers, gas-lasers are usually relied on because of the higher power requirement. The beams from these lasers are fairly circular, so optical components would have to be added to create an elliptical spot. As an alternative to rendering a circular spot elliptical, the beam may be split into two slightly separated, overlapping beams, which approximate an ellipse. (Such splitting of the beam could be done using fixed optics and thus does not give rise to the complexities and reliability problems associated with deflecting or switched splitting of the beam needed to write in between tracks as in the prior art formats.)

The above described embodiments are merely illustrations of the present invention. Numerous modifications and adaptations thereof will be readily apparent to those skilled in the art without departing from the spirit and scope of the present invention and the appended claims. For example, it is noted that the sequence of tracking marks in the particular embodiment of FIG. 3 is A,C,B,D. However, this sequence is not unique to the invention; the sequence B,C,A,D is also within the scope of the invention. (The skilled artisan will recognize that, in general, on-track marks A and B must be separated by one track and on-track marks C and D must be separated by a track.) The reversal of positions A and B (or, equivalently, C and D) from that shown in FIG. 3 only shifts the two Tracking Error Signals by 180°. Of course, the electronics described in FIGS. 5–8 would have to be adjusted for this sequence, but this is straight-forward and well within the grasp of one skilled in the art. Thus, the above description should be considered a representative embodiment of the invention and not a limitation on the scope of the invention.

What is claimed is:

1. An optical medium, comprising:

a multitude of sequential elongate tracks for storing information indicated by a multiple marked and unmarked track positions centered along the centerline of the tracks, the marks interacting with incident light to provide difference in light received from the marked and unmarked positions to form a read signal; and a servo field on each track for generating a tracking error signal from the read signal depending on marked positions that are not on the track, the servo field having multiple discrete positions centered on the centerline of the track in the same longitudinal positions along each track, the centered servo field positions including one marked position and at least two unmarked positions, the mark being in a different one of the centered servo field positions than the mark in the centered servo field position of each other track that is adjacent to the track, and the marked centered position in the servo field of each other track that is adjacent to the track is adjacent to an unmarked centered position in the servo field of the track so as to provide the tracking error signal.

2. The medium of claim 1, in which:

the multiple tracks include at least three sequential tracks forming a group of tracks;

the mark in the centered position in the servo field of each track is in a different one of the centered positions than the mark in the centered position of the servo field of any other of the tracks of the group.

3. The medium of claim 2, in which the group is one of multiple sequential adjacent groups of tracks, each group having the same number of sequential tracks that are not included in any other group, the marks in the different centered positions in the servo fields of the four tracks of each group form a pattern, each group has the same pattern as in each other group.

4. The medium of claim 2, in which the group is one of multiple sequential adjacent groups of tracks, each group having four sequential tracks that are not included in any other group, the marks in the four different centered positions in the servo fields of the four tracks of each group form a pattern, each group has the same pattern of marks in the centered positions of the servo fields as in each other group.

5. The medium of claim 1, in which:

each servo field contains four centered positions in the same longitudinal positions along the tracks, one centered position being marked and three centered positions being unmarked;

the multiple tracks include four sequential tracks forming a group of tracks; and the marked centered position in the servo field in each track is in a different one of the four centered positions than the marked centered position of the servo field of any other of the four tracks of the group.

6. The medium of claim 5, in which:

the four sequential centered positions in the servo field are first, second, third and fourth positions in numerical order along the track; and the track with the mark in the first position is separated by only one track from the track with the mark in the second positions and the track with the mark in the third position is separated by only one track from the track with the mark in the fourth position.

7. The medium of claim 6, in which:

the four sequential tracks of the group are first, second, third, and fourth tracks in numerical order in a lateral direction perpendicular to the longitudinal direction of the tracks;

the first track has the mark in the first position;

the second track has the mark in the third position;

the third track has the mark in the second position; and the fourth track has the mark in the fourth position.

8. The medium of claim 6, in which:

the four sequential tracks of the group are first, second, third, and fourth tracks in numerical order in a lateral direction perpendicular to the longitudinal direction of the tracks;

the first track has the mark in the second position;

the second track has the mark in the third position;

the third track has the mark in the first position; and the fourth track has the mark in the fourth position.

9. The medium of claim 1, in which:

each servo field contains first, second, third and fourth centered positions at the same longitudinal positions along the tracks sequentially in numerical order along the tracks, one position being marked and three positions being unmarked;

the difference between the read signal at the first and second positions form a first difference signal;

the difference between the read signal at the third and fourth positions forms a second difference signal that is 90 degrees out of phase with the first difference signal.

10. The medium of claim 1, in which the marks in the centered positions of the servo fields extend further in a lateral direction then they extend in the longitudinal direction, the lateral direction being perpendicular to the longitudinal direction.

11. The medium of claim 10, in which the optical recording medium is an optical disc, the longitudinal direction being a circumferential or tangential direction at each mark and a lateral direction being a radial direction at each mark, the circumferential and radial directions being with respect to the center of the disk.

12. The medium of claim 1, in which the marks in the centered positions of the servo fields have an ellipsoidal shape.

13. The medium of claim 1, in which the servo fields each include a clock mark in another position of the servo field in the same longitudinal position centered on the centerlines the tracks.

14. A circuit, comprising:

means for providing a first, second, third, and fourth signals depending on a read signal responsive to light received from the first, second, third, and fourth, respective positions within a servo field, the positions being centered on a centerline of a track of optical media;

means for determining a first difference signal depending on a difference between the first and second signals;

means for determining a second difference signal depending on a difference between the third and fourth signals; and means for selecting the difference signal with the smaller amplitude as a tracking error signal.

15. The circuit of claim 14, in which the first, second, third, and fourth positions are sequentially read in numerical order from the servo field.

16. The circuit of claim 14, in which the positions are sequentially read in order of third, second, first and fourth from the servo field.

17. The circuit of claim 14, in which the means for selecting selects the difference signal that was not selected as a tracking error signal, as a track crossing signal.

18. The circuit of claim 14, in which the means for selecting switches the selection for each track during a track seek.

* * * * *